US012093501B2

(12) United States Patent
Barsky et al.

(10) Patent No.: US 12,093,501 B2
(45) Date of Patent: *Sep. 17, 2024

(54) SYSTEMS AND METHODS FOR INTERACTING WITH THREE-DIMENSIONAL GRAPHICAL USER INTERFACE ELEMENTS TO CONTROL COMPUTER OPERATION

(71) Applicant: Illuscio, Inc., Culver City, CA (US)

(72) Inventors: Kevan Spencer Barsky, Los Angeles, CA (US); Joseph Bogacz, Perth (CA)

(73) Assignee: Illuscio, Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,516

(22) Filed: Feb. 2, 2023

(65) Prior Publication Data

US 2023/0400955 A1    Dec. 14, 2023

Related U.S. Application Data

(63) Continuation of application No. 17/838,393, filed on Jun. 13, 2022, now Pat. No. 11,579,748.

(51) Int. Cl.
| | | |
|---|---|---|
| *G06F 3/04815* | (2022.01) | |
| *G06F 3/04817* | (2022.01) | |
| *G06F 3/0487* | (2013.01) | |
| *G06F 9/451* | (2018.01) | |

(52) U.S. Cl.
CPC ...... *G06F 3/04815* (2013.01); *G06F 3/04817* (2013.01); *G06F 3/0487* (2013.01); *G06F 9/451* (2018.02)

(58) Field of Classification Search
CPC ............ G06F 3/04815; G06F 3/04817; G06F 3/0487; G06F 9/451
See application file for complete search history.

(56) References Cited

U.S. PATENT DOCUMENTS

| | | | | |
|---|---|---|---|---|
| 5,303,388 A | * | 4/1994 | Kreitman ............ | G06F 3/04817 715/848 |
| 5,678,015 A | * | 10/1997 | Goh ..................... | G06F 3/04815 715/848 |
| 6,266,098 B1 | * | 7/2001 | Cove .................. | H04N 21/4312 348/569 |

(Continued)

*Primary Examiner* — Patrick F Riegler
(74) *Attorney, Agent, or Firm* — Ansari Katiraei LLP; Arman Katiraei; Sadiq Ansari (57) ABSTRACT

Disclosed are three-dimensional ("3D") graphical user interface ("GUI") elements for improving user interactions with a digital environment or a device by simplifying access to different data, functionality, and operations of the digital environment or the device. A 3D GUI element may include first visual information at a first position and second visual information at a second position within the 3D space represented by the 3D GUI element. In response to first input directed to the first visual information, the 3D GUI or system may perform a first action that is mapped to the first input and the first visual information within the 3D GUI element. In response to second input directed to the second visual information, the 3D GUI or system may perform a second action that is mapped to the second input and the second visual information within the 3D GUI element.

19 Claims, 9 Drawing Sheets

(56) References Cited

U.S. PATENT DOCUMENTS

| | | | | |
|---|---|---|---|---|
| 7,216,305 B1* | 5/2007 | Jaeger | G06F 3/033 | 715/848 |
| 8,046,714 B2* | 10/2011 | Yahiro | G06F 3/0488 | 715/848 |
| 8,237,714 B1* | 8/2012 | Burke | G06T 11/206 | 715/764 |
| 8,429,564 B2* | 4/2013 | Alexanderovitc | G06F 1/1626 | 715/850 |
| 11,170,582 B1* | 11/2021 | McNeil | G06F 16/483 | |
| 11,227,010 B1* | 1/2022 | Vieira De Souza | G06Q 30/02 | |
| 11,533,467 B2* | 12/2022 | McNeil | H04N 13/302 | |
| 2002/0000998 A1 | 1/2002 | Scott et al. | | |
| 2003/0117440 A1 | 6/2003 | Hellyar et al. | | |
| 2004/0100479 A1* | 5/2004 | Nakano | G06F 3/0485 | 715/700 |
| 2004/0155907 A1* | 8/2004 | Yamaguchi | G06F 3/0481 | 715/810 |
| 2005/0071767 A1 | 3/2005 | Kirkland | | |
| 2005/0086611 A1* | 4/2005 | Takabe | G06F 3/0482 | 715/830 |
| 2006/0187204 A1 | 8/2006 | Yi et al. | | |
| 2006/0242602 A1 | 10/2006 | Schechter et al. | | |
| 2009/0089692 A1* | 4/2009 | Morris | G06F 3/0481 | 715/764 |
| 2009/0164945 A1* | 6/2009 | Li | G06F 3/04842 | 715/849 |
| 2009/0293014 A1* | 11/2009 | Meuninck | G06F 3/04817 | 715/810 |
| 2010/0050129 A1* | 2/2010 | Li | G06F 3/0481 | 715/849 |
| 2010/0093400 A1* | 4/2010 | Ju | G06F 3/04817 | 715/702 |
| 2010/0227686 A1* | 9/2010 | Brunet De Courssou | G07F 17/32 | 463/31 |
| 2010/0315417 A1* | 12/2010 | Cho | G06F 1/1643 | 345/419 |
| 2011/0096006 A1* | 4/2011 | Jeong | H04M 1/72469 | 345/173 |
| 2011/0102460 A1 | 5/2011 | Parker | | |
| 2011/0102556 A1* | 5/2011 | Kim | H04N 13/359 | 348/51 |
| 2011/0283213 A1* | 11/2011 | Leebow | G06F 3/0486 | 715/849 |
| 2011/0310100 A1* | 12/2011 | Adimatyam | G06F 3/017 | 382/103 |
| 2012/0056900 A1* | 3/2012 | Park | G06F 3/04815 | 345/661 |
| 2012/0062564 A1* | 3/2012 | Miyashita | G06F 1/1643 | 345/173 |
| 2012/0260215 A1* | 10/2012 | Fennel | H04W 4/50 | 715/825 |
| 2012/0260217 A1* | 10/2012 | Celebisoy | G06F 3/04815 | 715/836 |
| 2012/0260218 A1* | 10/2012 | Bawel | G06F 3/04815 | 715/841 |
| 2013/0033447 A1* | 2/2013 | Cho | G06F 3/04886 | 345/173 |
| 2013/0047121 A1* | 2/2013 | Kao | G06F 9/44505 | 715/810 |
| 2013/0127850 A1* | 5/2013 | Bindon | G06T 19/20 | 345/420 |
| 2013/0145322 A1* | 6/2013 | Hendricks | G06F 3/0482 | 715/834 |
| 2013/0185642 A1* | 7/2013 | Gammons | G06F 3/04817 | 715/765 |
| 2013/0311946 A1* | 11/2013 | Kwon | G06F 3/0482 | 715/811 |
| 2013/0336524 A1 | 12/2013 | Zhang et al. | | |
| 2013/0346911 A1* | 12/2013 | Sripada | G06F 3/04817 | 715/782 |
| 2015/0019983 A1* | 1/2015 | White | G06Q 30/02 | 715/739 |
| 2015/0106851 A1* | 4/2015 | Pauli | G06F 3/0386 | 725/52 |
| 2015/0135105 A1* | 5/2015 | Jain | G06F 3/04883 | 715/765 |
| 2015/0317058 A1* | 11/2015 | Babarykin | G06F 3/04842 | 715/765 |
| 2016/0062636 A1* | 3/2016 | Jung | G06F 3/04817 | 715/762 |
| 2016/0154564 A1* | 6/2016 | Chiang | G06F 3/0488 | 715/834 |
| 2016/0357399 A1* | 12/2016 | Shin | G06F 3/017 | |
| 2017/0139548 A1* | 5/2017 | De Las Heras | G06F 3/0485 | |
| 2017/0371039 A1* | 12/2017 | Clark | G01S 7/539 | |
| 2017/0371523 A1* | 12/2017 | Liao | G06F 3/04815 | |
| 2018/0259775 A1* | 9/2018 | Ono | G06F 3/04815 | |
| 2019/0026004 A1* | 1/2019 | Caen | G06F 3/04815 | |
| 2019/0121522 A1* | 4/2019 | Davis | G06V 40/28 | |
| 2019/0347865 A1* | 11/2019 | Hackett | G06T 13/20 | |
| 2020/0012409 A1* | 1/2020 | Sadacharam | G06T 19/20 | |
| 2023/0368458 A1* | 11/2023 | Dryer | G06T 19/20 | |

\* cited by examiner

SYSTEMS AND METHODS FOR INTERACTING WITH THREE-DIMENSIONAL GRAPHICAL USER INTERFACE ELEMENTS TO CONTROL COMPUTER OPERATION

CLAIM OF BENEFIT TO RELATED APPLICATIONS

This application is a continuation of U.S. nonprovisional application Ser. No. 17/838,393 entitled "Systems and Methods for Interacting with Three-Dimensional Graphical User Interface Elements to Control Computer Operation", filed Jun. 13, 2022. The contents of application Ser. No. 17/838,393 are hereby incorporated by reference.

BACKGROUND

The two-dimensional ("2D") nature of icons, emojis, wallpapers, and other graphical user interface ("GUI") elements restricts their functionality and interactivity. For instance, the amount of information that may be presented in two dimensions is less than the amount of information that may be presented in three dimensions. Similarly, interactions with a 2D GUI element may be restricted to the x and y planes, whereas interactions with a three-dimensional ("3D") GUI element may be performed about the x, y, and z planes.

DETAILED DESCRIPTION OF PREFERRED EMBODIMENTS

The following detailed description refers to the accompanying drawings. The same reference numbers in different drawings may identify the same or similar elements.

Provided are systems and methods for interacting with three-dimensional ("3D") graphical user interface ("GUI") elements to control computer operation. The systems and methods may generate the 3D GUI elements from point clouds and/or other 3D file formats, may dynamically manipulate the 3D GUI elements with different 3D effects based on different sensor outputs, conditions, events, and/or user input, and/or may control the operation of a computer or other electronic device based on the 3D position at which a 3D GUI element is presented when input is provided relative to that GUI element.

The systems and methods may therefore include a GUI with one or more 3D GUI elements for simplifying and improving user interactions with a digital environment or a device, and for accessing different data, functionality, and operations of the digital environment or the device. Due to the different computer functionality that is performed in response to different 3D positional data associated with an interacted with 3D GUI element, there are no two-dimensional ("2D") counterparts or adaptations of 2D GUI elements for implementing the same controls or functionality.

The 3D GUI elements may include 3D icons, 3D emojis, 3D wallpapers, and/or other 3D objects that present different visual information and/or are associated with different executable functionality at different positions within the 3D space (e.g., different x, y, and z positions) represented by the 3D GUI element. In some embodiments, the 3D icons may include 3D GUI elements for launching an application, receiving data about an application, and/or otherwise interacting with an application in a closed, minimized, inactive, sleep, and/or unopened state. In some embodiments, the 3D icons may include 3D GUI elements within an application that has focus or is in an open or active state. In some such embodiments, a single 3D GUI element may be used to invoke different functions or operations of the application or to perform various interactions with the application.

In some embodiments, a 3D GUI element may be rotated and/or interacted with in various ways to expose the different visual information contained in the 3D space of that 3D GUI element. In some embodiments, the same 3D GUI element may be interacted with to invoke different functionality that is associated with the different visual information when that visual information is presented on the 3D GUI element.

The 3D GUI and 3D GUI elements may be implemented on various interactive devices that have a display. For instance, the 3D GUI and 3D GUI elements may be presented on a smartphone, handheld mobile device, laptop computer, desktop computer, headset, Internet-of-Things ("IoTs") device, controllers, and/or wearable devices (e.g., smartwatches).

Figure 1:
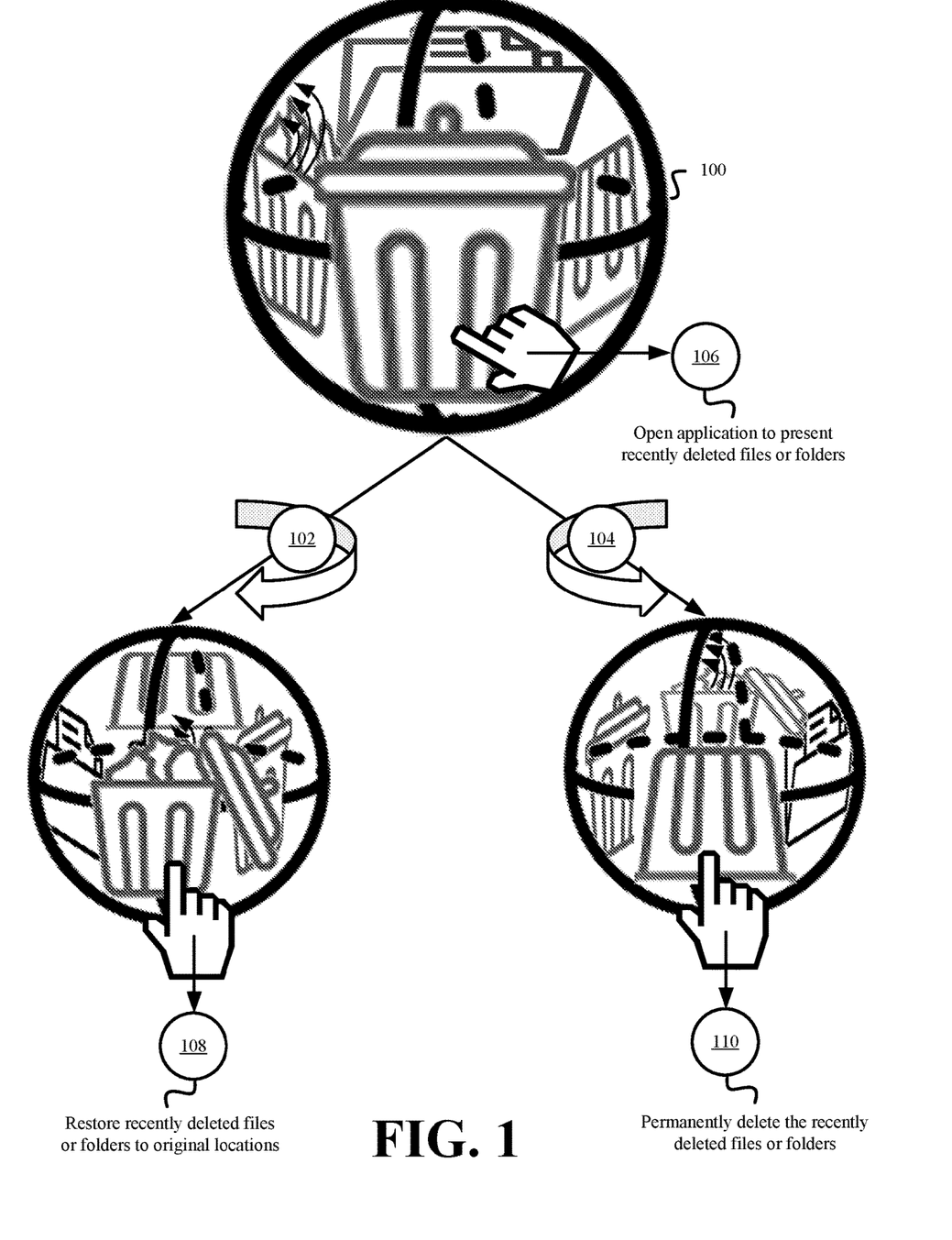
FIG. 1 illustrates an example of three-dimensional ("3D") icon for an application in a closed, minimized, inactive, sleep, and/or unopened state in accordance with some embodiments presented herein.

FIG. 1 illustrates an example of 3D icon 100 for an application in a closed, minimized, inactive, sleep, and/or unopened state in accordance with some embodiments presented herein. 3D icon 100 may include a 3D image that is rendered from x, y, and z positional data and non-positional data (e.g., visual information defined for each of the x, y, and z positions) contained within a point cloud or other 3D image file format. In some embodiments, 3D icon 100 may be presented as a volumetric, cubic, or spherical object. 3D icon 100 may be associated with one or more rules that control the rotation or movement of 3D icon 100 in response to no inputs, different sensor outputs, detected actions, detected events, and/or input that are directed to 3D icon 100 or the application that is accessed using 3D icon 100.

Different visual information may be defined at different positions within the point cloud or 3D image for 3D icon 100. For instance, at a default position, 3D icon 100 may include a first set of data points with positional and non-positional elements that generate a closed trash can image in the foreground, a second set of data points with positional and non-positional elements that generate a restore trash can image about the left side, a third set of data points with positional and non-positional elements that generate an empty trash can image about the right side, and a fourth set of data points with positional and non-positional elements that generate an open folder image in the back. Specifically, the first set of data points may include x, y, and z coordinates that position the first set of data points towards the front of the point cloud or 3D icon 100 when rendering 3D icon 100 from the default position, the second set of data points may include x, y, and z coordinates that position the second set of data points about the left side of the point cloud or 3D icon 100 when rendering 3D icon 100 from the default position, the third set of data points may include x, y, and z coordinates that position the third set of data points about the right side of the point cloud or 3D icon 100 when rendering 3D icon 100 from the default position, and the fourth set of data points may include x, y, and z coordinates that position the fourth set of data points about the rear of the point cloud or 3D icon 100 when rendering 3D icon 100 from the default position.

In some embodiments, the 3D GUI may rotate 3D icon 100 to present the different visual information in response to sensor output that indicates a rotation or movement of the device presenting the 3D GUI. For instance, the device may include a gyroscope or accelerometer that measures a rightward rotation of the device, and 3D icon 100 may be defined with a rule that generates a complementary rotation of 3D icon 100 based on the rightward rotation of the device. The rightward rotation of the device may cause movement away from the visual information about the front side of 3D icon 100 and movement towards the visual information about a left side of 3D icon 100. In other words, the 3D GUI may render different data points from the point cloud of 3D icon 100 at the position of 3D icon 100 within the 3D GUI as the device itself rotates. In some embodiments, the device may include a headset worn by a user, and 3D icon 100 may rotate in response to head movements or tracked eye movements. In some other embodiments, the device may include sensors that detect or map the position and/or orientation of the user (e.g., the user's face or head) relative to the device. Accordingly, in response to detecting movement of the user in a first direction, the 3D GUI may rotate 3D icon 100 in the corresponding first direction or an opposite second direction depending on the mapping of the detected motion to icon controls.

In some embodiments, the 3D GUI may rotate 3D icon 100 in response to user input provided to, over, or for 3D icon 100. For instance, an upwards swipe gesture on 3D icon 100 may cause 3D icon 100 to rotate in the direction and with a velocity associated with the swipe gesture. Similarly, a detected mouse click while a cursor is placed over 3D icon 100 followed by an upward movement of the mouse may cause a corresponding rotation of 3D icon 100 that is determined based on the direction of the mouse movement as well as the speed or distance the mouse is moved. Specifically, rotating 3D icon 100 in response to user input may include updating a render frustum or camera position within the corresponding point cloud or 3D image file based on the direction and magnitude of the input, and presenting or rendering the data points of the point cloud or 3D image file from the updated render position.

As shown in FIG. 1, user input that rotates (at 102) 3D icon 100 to the left may change the visualization of 3D icon 100 to present the second set of data points in the foreground. Similarly, user input that rotates (at 104) 3D icon 100 to the right may change the visualization of 3D icon 100 to present the third set of data points in the foreground.

In some embodiments, the same 3D rendering effects may be applied to a 3D wallpaper or image. The 3D wallpaper or image may include a high resolution 3D rendering and/or visualization that is generated from a particular camera position within the 3D space of a point cloud or other 3D image file. The device on which the 3D wallpaper or image is displayed may rotate or move. The 3D GUI may apply a rotation or movement provided based on user input or other interaction to the position of the camera within the point cloud or other 3D image file, and may render the 3D wallpaper or image from the updated position of the camera. Accordingly, the 3D GUI continues rendering the same point cloud or 3D image albeit from different positions that are determined from different rotations or movements of the device.

Different executable functionality may be associated with the different sets of data points forming 3D icon 100, and may be invoked when user input is applied over each set of data points. For instance, the data points within each particular set may be encoded with or linked to a function call, application programming interface ("API") call, system call, executable script, and/or other computer code such that when particular input (e.g., a tap, double click, selection, etc.) is directed over or to any data point of the particular data point set, the corresponding function, call, or code may be executed.

Accordingly, tapping, double clicking, or otherwise selecting (at 106) the closed trash can image when the first set of data points are displayed frontmost in 3D icon 100 may cause a recycle bin application or function associated with 3D icon 100 to open and present recently deleted files or folders. Tapping, double clicking, or otherwise selecting (at 108) the restore trash can image when the second set of data points are displayed frontmost in 3D icon 100 may cause the recycle bin application to restore the recently deleted files or folders. Tapping, double clicking, or otherwise selecting (at 110) the empty trash can image when the third set of data points are displayed frontmost in 3D icon 100 may cause the recycle bin application to permanently delete the recently deleted files or folders. Tapping, double clicking, or otherwise selecting the open folder image when the fourth set of data points are displayed frontmost in 3D icon 100 may cause the 3D GUI to change 3D icon 100 and render a new point cloud that presents visual information for one or more of the recently deleted files or folders within the recycle bin application. Accordingly, different positions or different sets of data points within the same point cloud or 3D image file used to render 3D icon 100 may be associated with and used to access different functionality.

In some embodiments, the 3D GUI may rotate 3D icon 100 in response to a rule that controls the rotation and/or movement of 3D icon 100 when there is no sensor output, actions, events, or input being directed to 3D icon 100. For instance, the rule may be defined to create a non-stationary icon so that visual information from all sides of 3D icon 100 are visible even when the device is not rotated or moved.

Figure 2:
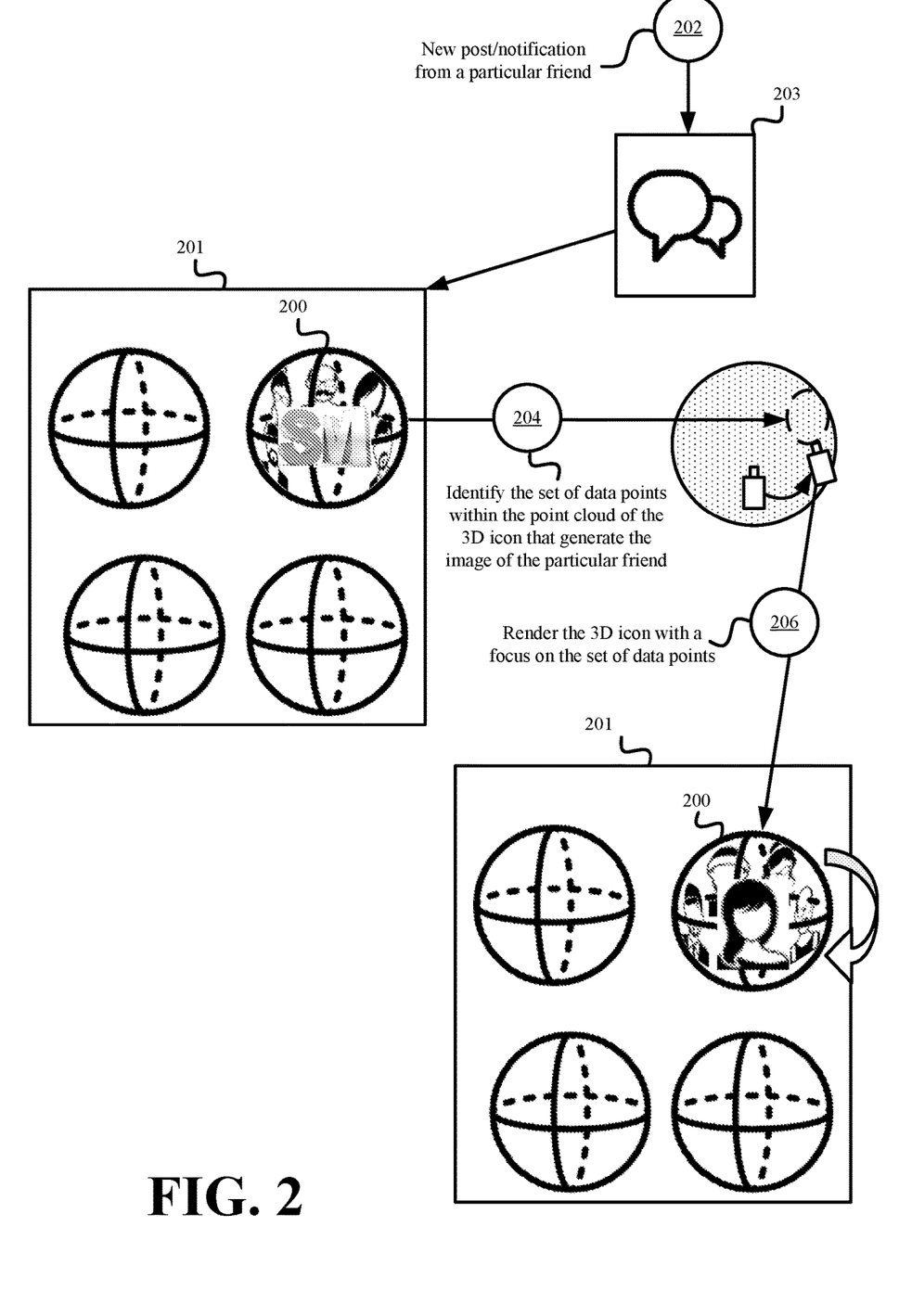
FIG. 2 illustrates an example of dynamically manipulating a 3D icon in response to different conditions or events and in accordance with some embodiments presented herein.

FIG. 2 illustrates an example of dynamically manipulating 3D icon 200 in response to different conditions or events and in accordance with some embodiments presented herein. 3D GUI 201 may detect (at 202) a condition or event that is directed to 3D icon 200 or application 203 that is accessed using 3D icon 200. 3D icon 200 may be generated from rendering a plurality of data points that are defined with positional (e.g., x, y, and z coordinate values) and non-positional elements (e.g., red, blue, green, chrominance, luminance, translucence, and/or other descriptive characteristics) in a point cloud or another 3D file format. 3D icon 200 may be used to launch social media application 203. Social media application 203 may receive a new post or notification while running in the background, via a push notification, periodic updating, and/or other updates. Social media application 203 may notify or otherwise message 3D GUI 201 of the new post or notification.

Rather than add a badge to identify the new post or notification as is done for 2D icons, 3D icon 200 may be associated with different rules that specify different 3D rotations, movements, or other manipulations of 3D icon 200 in response to the different conditions or events. As shown in FIG. 2, 3D icon 200 may include a 3D image that includes the faces or photographs of different friends or contacts within social media application 203. 3D GUI 201 may identify (at 204) the set of data points, that are linked to or correspond to the image of the particular friend, within the point cloud or 3D image from which 3D icon 200 is generated, and may render (at 206) the point cloud or 3D image file to center on the set of data points. Other data points for images of other friends or contacts that fall within the render frustrum may also be rendered in the sides or background of 3D icon 200. In some embodiments, 3D GUI 201 may gradually adjust the render position within the point cloud or 3D image file to move from a last render position to the position and orientation that is centered on and in front of the set of data points representing the image of the particular friend. In so doing, 3D GUI 201 may generate (at 206) a 3D animation effect that rotates 3D icon 200 to the image of the particular friend and that zooms in on the image of the particular friend so that the face or photograph of the particular friend becomes the focus of 3D icon 200 and consumes a larger portion of 3D icon 200.

In response to new or unread posts from multiple friends, 3D icon 200 may rotate back and forth and/or zoom in and out between the faces or photographs of each friend with a new or unread post. In contrast to an animated 2D icon that may switch between different images, 3D icon 200 is a single 3D image created from a single point cloud or 3D image file format, and the associated movements may include moving to and presenting visual information from different parts within that single 3D image or 3D icon 200.

Figure 3:
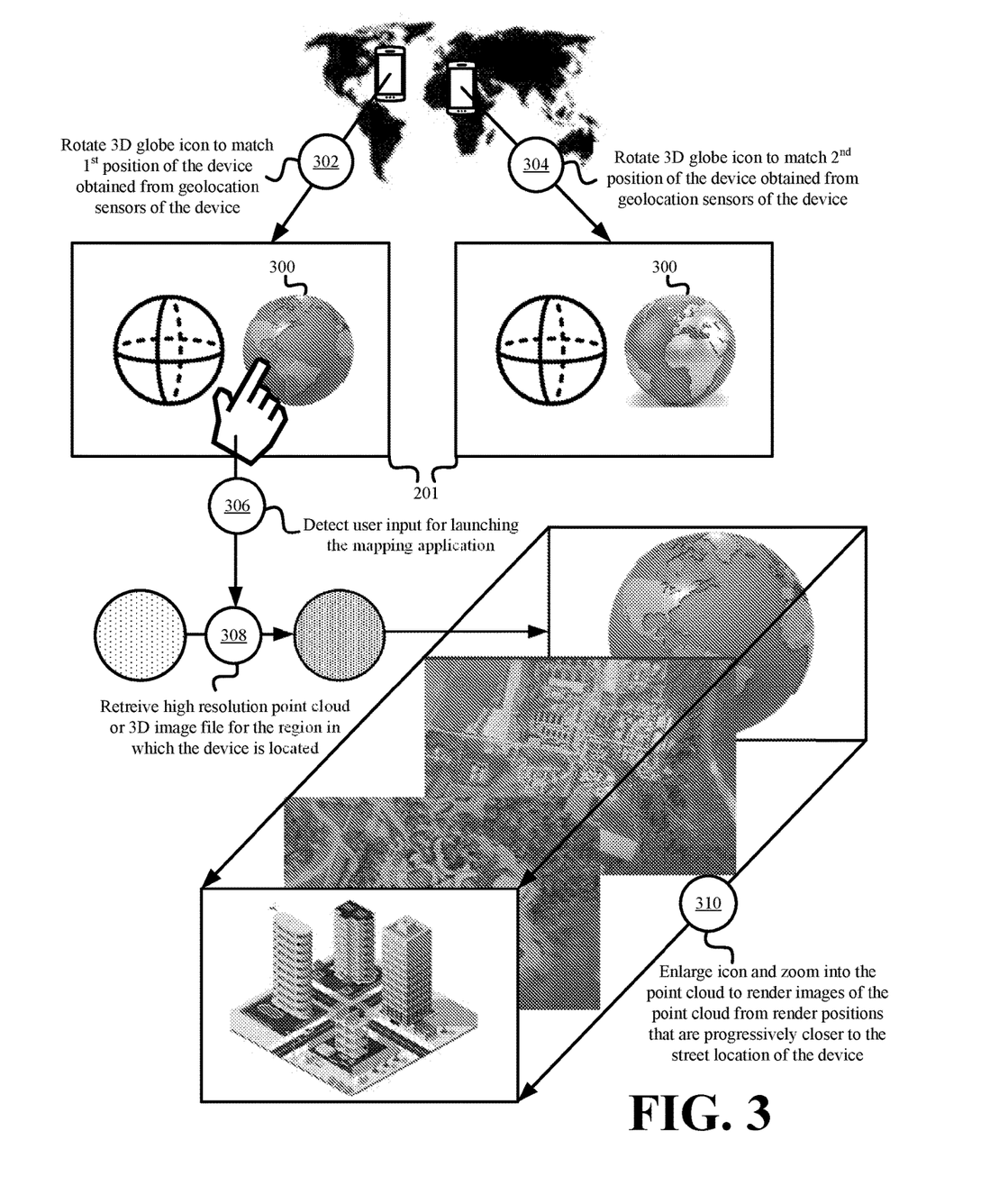
FIG. 3 illustrates an example of launching an application using a 3D icon in accordance with some embodiments presented herein.

FIG. 3 illustrates an example of launching an application using 3D icon 300 in accordance with some embodiments presented herein. 3D icon 300 may be used to launch or access a mapping application. 3D icon 300 may be a 3D image of the Earth or a globe that may be generated from a first low resolution point cloud or 3D image file of the Earth or globe. Specifically, 3D icon 300 may be generated from rendering the data points of the first low resolution point cloud or 3D image file from a first distant position.

3D GUI 201 may rotate (at 302 and 304) 3D icon 300 based on positional data received from a Global Positioning System ("GPS") sensor and/or other geolocational services of the device. For instance, 3D GUI 201 may rotate (at 302) 3D icon 300 to center on a first detected position of the device, and may rotate (304) 3D icon 300 to center on a second detected position of the device. In some embodiments, 3D icon 300 may rotate and zoom in to show the particular state or city in which the device is located with at the first resolution of the point cloud or 3D image file.

3D GUI 201 may detect (at 306) user input that launches the mapping application. For instance, user input may include a touch, tap, or other gesture applied to or over 3D icon 300.

Launching the mapping application may include retrieving (at 308) a second high resolution point cloud or 3D image file for 3D icon 300. In some embodiments, the second high resolution point cloud or 3D image file may include more data points for representing the Earth or globe than the first low resolution point cloud or 3D image file. In some embodiments, 3D GUI 201 may select between different point clouds that are high resolution scans of different countries, states, or regions based on the current position of the device.

Launching the mapping application may further include performing (at 310) a first 3D zoom effect in which 3D icon 300 is enlarged and shown from a closer vantage point that occupies all or most of the display, and/or performing (at 310) a second 3D zoom effect in which the 3D image zooms in from the faraway view of the Earth or globe to the exact street, block, or address where the device is located. Specifically, 3D GUI 201 may perform (at 310) the zoom effects by enlarging 3D icon 300 and rendering different images of the second high resolution point cloud as the render position moves progressively closer inside the second high resolution point cloud to the street location of the device. The 3D effect created by 3D GUI 201 launching the mapping application associated with 3D icon 300 is not generated by switching between different 2D image files. Instead, the 3D effect is generated by moving within a point cloud to present different visual information contained therein.

Figure 4:
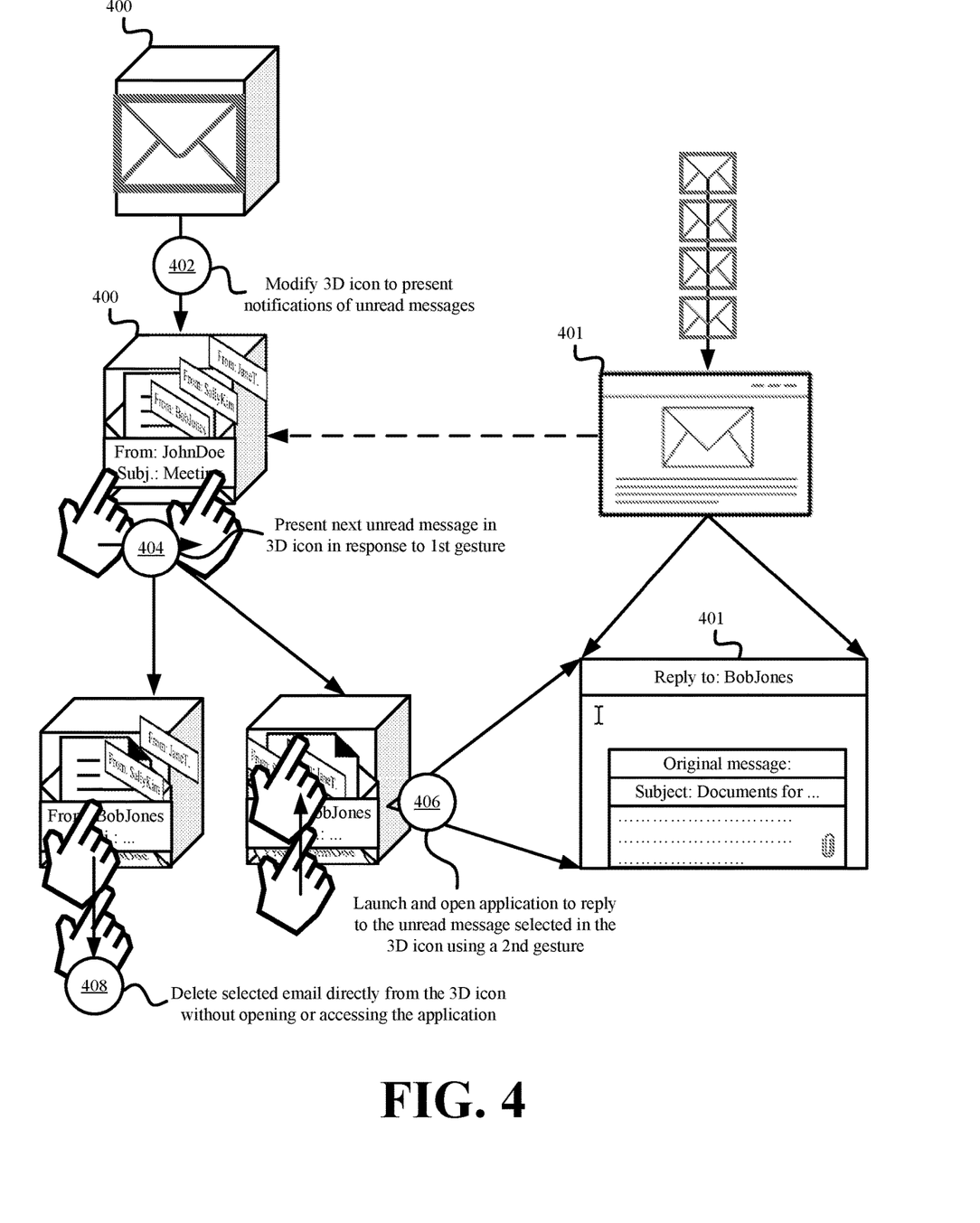
FIG. 4 illustrates an example of using different gestures to access different information from a 3D icon in accordance with some embodiments presented herein.

FIG. 4 illustrates an example of using different gestures to access different information from a 3D icon in accordance with some embodiments presented herein. As shown in FIG. 4, 3D icon 400 may include a GUI element for accessing or opening email application 401.

The 3D GUI may dynamically update 3D icon 400 to layer visual information related to different unread emails in the 3D space represented by 3D icon 400. For instance, the 3D GUI may dynamically modify (at 402) 3D icon 400 to identify new unread emails that have arrived from different senders, and may layer, stagger, or otherwise arrange the notifications for each email in the 3D space of 3D icon 400. 3D icon 400 may be updated to present the sender information and/or subject line from a most recently received unread email or message. Specifically, as each unread message notification is received by the device, 3D GUI, or email application 401, the 3D GUI may modify the point cloud or 3D image file used to create 3D icon 400 to include a visualization for that unread message notification. In some embodiments, the 3D GUI may add or define a set of data points at a different plane within the GUI to provide a visualization for each unread message notification. In some such embodiments, 3D icon 400 may include a certain number of planes that limit the number of unread message notifications that may be presented or visualized within 3D icon 400.

Different user gestures may then be used to access different unread emails directly from 3D icon 400. For instance, a right swipe gesture applied to 3D icon 400 may cause 3D icon 400 to rotate and present (at 404) the sender information and/or subject line from the next most recently received unread email or may invoke right scroll functionality that continues to rotate between the notifications for the unread messages in 3D icon 400 until the gesture is stopped. In this manner, the user may view visual information about the unread emails without opening email application 401.

After halting the right swipe gesture on a particular email message in 3D icon 400, a different gesture may be used to open (at 406) email application 401 directly to that particular email message. For instance, an up swipe gesture while the visual information for the particular email message is displayed centrally within 3D icon 400 may cause the 3D GUI to open email application 401 and invoke the email reply function so that email application 401 opens directly to a screen in which the user may enter text for a reply message to the particular email message. More specifically, the 3D GUI may determine which set of data points are presented frontmost or centrally within 3D icon 400 when the up swipe gesture is issued, may determine the particular email message that is associated with or linked to the set of data points, may determine the command or function (e.g., reply message function) that is mapped to the up swipe gesture and 3D icon 400, and may perform the command or function with the particular email message specified as a variable to open email application 401 directly to the reply message interface for the particular email message.

Similarly, a down swipe gesture applied over 3D icon 400 while the particular email message is centered within 3D icon 400 may invoke (at 408) a delete or archive email function of email application 401 directly from 3D icon 400 without opening, launching, and/or directly accessing email application 401. In other words, the user may delete, archive, or invoke other functions or operations of email application 401 on specific emails based on gestures or inputs provided directly to 3D icon 400 while email application 401 remains in a closed, minimized, inactive, sleep, and/or unopened state. Once again, the 3D GUI may determine which set of data points are presented frontmost or centrally within 3D icon 400 when the down swipe gesture is issued, may determine the particular email message that is associated with or linked to the set of data points, may determine the command or function (e.g., delete message function) that is mapped to the down swipe gesture and 3D icon 400, and may perform the command or function with the particular email message specified as a variable to delete the particular email message.

Similar functionality and/or operations of other applications may be invoked for other applications in a closed, minimized, inactive, sleep, and/or unopened state based on gestures or user inputs provided to 3D icons of those applications, and based on a mapping of the application functions to different gestures applied to the corresponding 3D icons. For instance, a user may discard or mark social media posts or text messages as read based on different gestures applied to the 3D icon for the associated social media application or text messaging application while the 3D icon is rotated to and/or centered on those social media posts or text messages, may delete, edit, or share photographs based on different gestures applied to the 3D icon for a closed, minimized, inactive, sleep, and/or unopened camera or photograph viewing application while the 3D icon is rotated to and/or centered on those photographs, and/or may receive, send, accept, or decline payments based on different gestures applied to the 3D icon for a closed, minimized, inactive, sleep, and/or unopened payment application while the 3D icon is rotated to and/or centered on notifications regarding those payments.

In some embodiments, the 3D GUI elements may include 3D emojis. A 3D emoji may include a 3D image that is generated from the positional data and non-positional data of different points defined within a point cloud. Rules may be defined for the 3D emoji and/or different data points of the 3D emoji to automatically modify the 3D emoji in response to different detected events, conditions, messages, and/or inputs.

Figure 5:
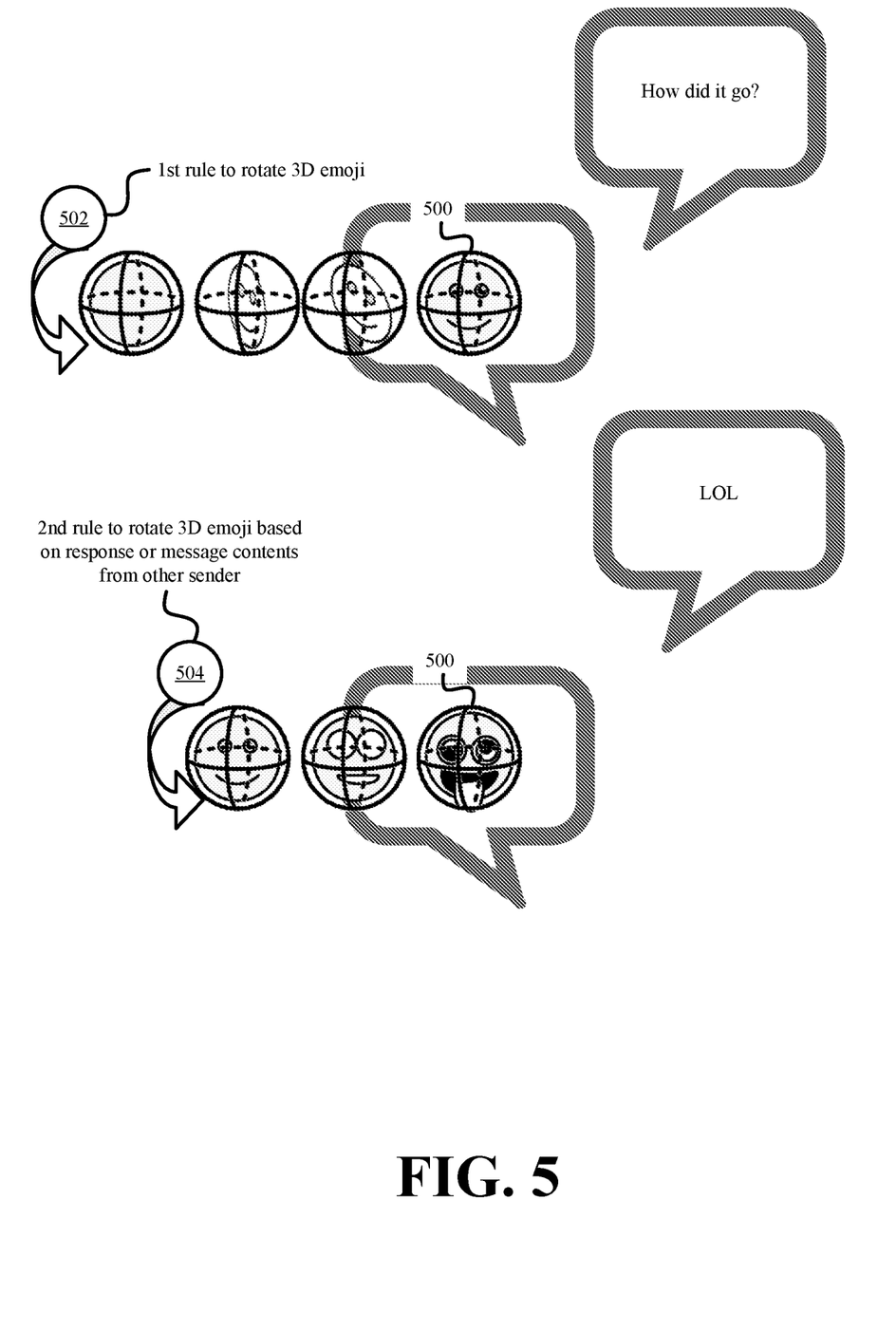
FIG. 5 illustrates an example of dynamically manipulating a 3D emoji based on different user input and/or different rules associated with the 3D emoji in accordance with some embodiments presented herein.

FIG. 5 illustrates an example of dynamically manipulating 3D emoji 500 based on different user input and/or different rules associated with the 3D emoji in accordance with some embodiments presented herein. 3D emoji 500 may be sent in a message exchange between two or more users. For instance, 3D emoji 500 may be sent by a first user in response to a text message, social media post, shared image, or other content sent by a second user.

A first rule associated with 3D emoji 500 may define and generate (at 502) a first set of rotations or movements to apply to 3D emoji 500 when presenting 3D emoji 500 to the second user. The first set of rotations or movements may include rendering the point cloud or data points associated with 3D emoji 500 from a first set of positions as specified by the first rule.

A second rule associated with 3D emoji 500 may define and generate (at 504) a second set of rotations, movements, and/or 3D effects to apply to 3D emoji 500 based on a response provided by the second user after being presented with 3D emoji 500 and the first set of rotations or movements. For instance, the second user may respond with a message that includes the phrase "LOL", and the phrase may be a keyword that is tied to a rule that triggers the second set of rotations, movements, and/or 3D effects. The second set of rotations, movements, and/or 3D effects may include adjusting the positioning of the point cloud data points to create the 3D effect illustrated in FIG. 5.

In some embodiments, the 3D GUI elements may replace 2D buttons, menus, sliders, and/or other 2D GUI elements within an open, active, or frontmost application. In some such embodiments, a single 3D GUI element may be used to replace and/or invoke the functionality associated with multiple 2D buttons, menu items, sliders, and/or 2D GUI elements.

Figure 6:
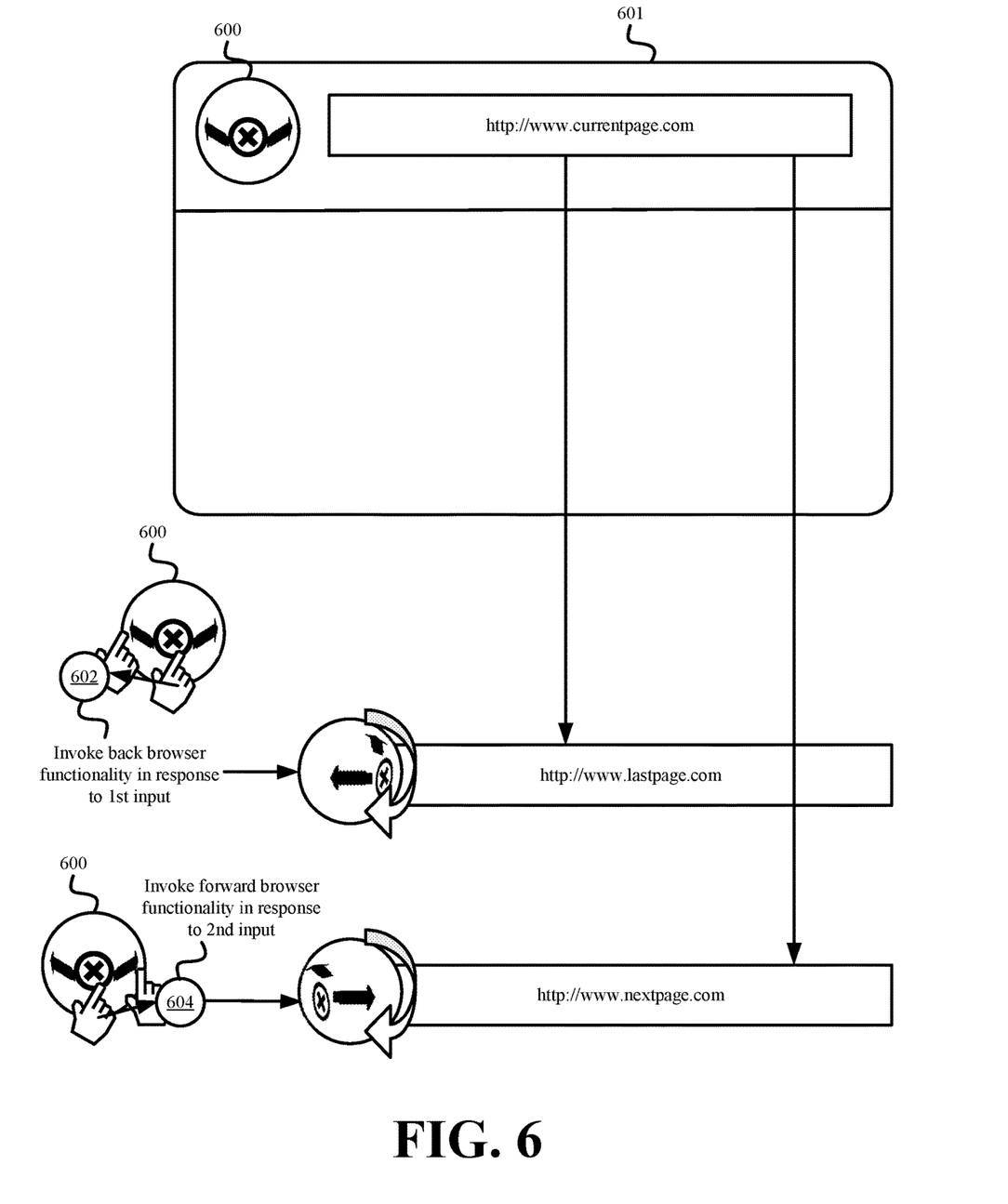
FIG. 6 illustrates an example of a 3D GUI element for invoking different functionality within an open, active, or frontmost application in accordance with some embodiments presented herein.

FIG. 6 illustrates an example of 3D GUI element 600 for invoking different functionality within an open, active, or frontmost application 601 in accordance with some embodiments presented herein. 3D GUI element 600 may be a single interactive element that replaces the back, forward, and stop elements of web browser application 601. In some embodiments, 3D GUI element 600 may be a single interactive element that replaces the fast forward, rewind, and stop elements of a media player application and/or that controls other operations of other applications.

3D GUI element 600 may include a 3D image that is generated from rendering a single point cloud or other 3D image file from a first 3D position. Specifically, 3D GUI element 600 may present first visual information when the point cloud is rendered from the first 3D position as a result of no user input being applied to 3D GUI element 600.

The 3D GUI associated with application 601 may detect first user input that is applied to 3D GUI element 600 and that invokes the browser back button functionality. For instance, the first user input may include a left swipe gesture.

In response to the first user input, the 3D GUI may rotate (at 602) 3D GUI element 600 to present second visual information that indicates invocation of the browser back functionality. Specifically, the first user input may trigger a first rule that causes the 3D GUI to render the point cloud from a second position at which the second visual information is visible. Additionally, browser application 601 may retrieve and display the last accessed site in the browser history in response to the invocation of the browser back button functionality.

The 3D GUI may detect second user input that is applied to 3D GUI element 600 and that invokes the browser forward functionality. For instance, the second user input may include right swipe gesture.

In response to the second user input, the 3D GUI may rotate (at 604) 3D GUI element 600 to present third visual information that indicates invocation of the browser forward functionality. Specifically, the second user input may trigger a second rule that causes the 3D GUI to render the point cloud from a third position at which the third visual information is visible. Additionally, browser application 601 may retrieve and display (at 604) next accessed site in the browser history in response to the invocation of the browser forward button functionality.

The 3D GUI may detect third user input that is applied to 3D GUI element 600 and that invokes the browser halt functionality. For instance, the third user input may include a touch and hold or tap gesture on 3D GUI element 600. In response to the third user input, the 3D GUI may cause 3D GUI element 600 to rotate back to the first visual information and to wobble the first visual information to indicate that the browser halt functionality has been invoked.

Figure 7:
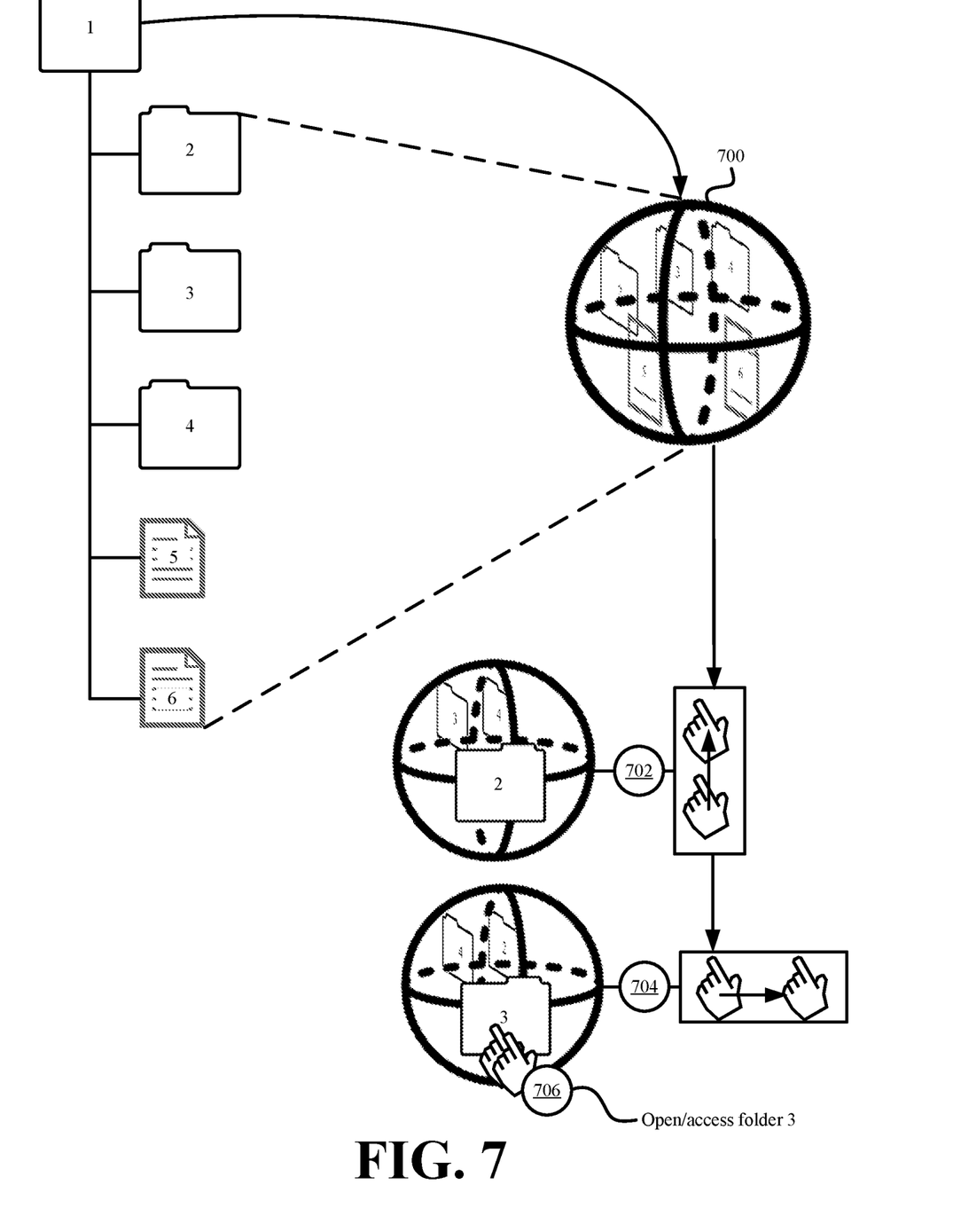
FIG. 7 illustrates an example of a 3D GUI element for controlling file system access in accordance with some embodiment presented herein.

In some embodiments, the 3D GUI elements may be used to control file system access and/or navigation through a directory structure. FIG. 7 illustrates an example of 3D GUI element 700 for controlling file system access in accordance with some embodiment presented herein.

As shown in FIG. 7, the 3D GUI may generate 3D GUI element 700 based on a point cloud or other 3D image file that graphically represents a particular folder structure. For instance, 3D GUI element 700 may include visual information for different folders or directories as well as files under a particular parent folder or directory.

First user input may rotate 3D GUI element 700 in order to expose the visual information for the different contained folders, directories, and/or files by rendering the point cloud or 3D image file from different render positions. For instance, an up swipe gesture followed by a right or left swipe gesture may be used to access and/or present (at 702 and 704) the visual information for the different folders or directories under the particular parent folder or directory. Similarly, a down swipe gesture followed by a right or left swipe gesture may be used to access and/or present the visual information for the different files under the particular parent folder or directory. The presented visual information may include the name of the folder, directory, or file, or may include an icon associated with the folder, directory, or file.

The user may access a particular folder by stopping rotation of 3D GUI element 700 when the visual information for the particular folder is presented in 3D GUI element 700. In some embodiments, the different visual information or render positions within the point cloud may be associated or linked to different folders and/or files. Accordingly, second user input may be issued with respect to 3D GUI element 700 to access (at 706) the particular folder. For instance, the second user input may include a double tap gesture when the visual information for the particular folder is displayed within 3D GUI element 700.

In response to the second user input being issued when the visual information for the particular folder is displayed within 3D GUI element 700, the 3D GUI may open or access the particular folder, and/or may adjust 3D GUI element 700 to present visual information for the files or folders that are stored under the particular folder.

Other inputs or gestures may be associated with other file system commands. For instance, a two finger expand gesture performed over the visual information for a specific folder may invoke a copy command that copies the specific folder and its contents. Single finger swipe gestures and double tap gestures may then be used to navigate to a different location in the file system, and a two finger pinch gesture may paste the copied specific folder and its contents to the navigated to location within the file system. In some embodiments, a two finger tap gesture performed over the visual information for a specific folder or file may cause the 3D GUI or file system to delete that folder or file.

Figure 8:
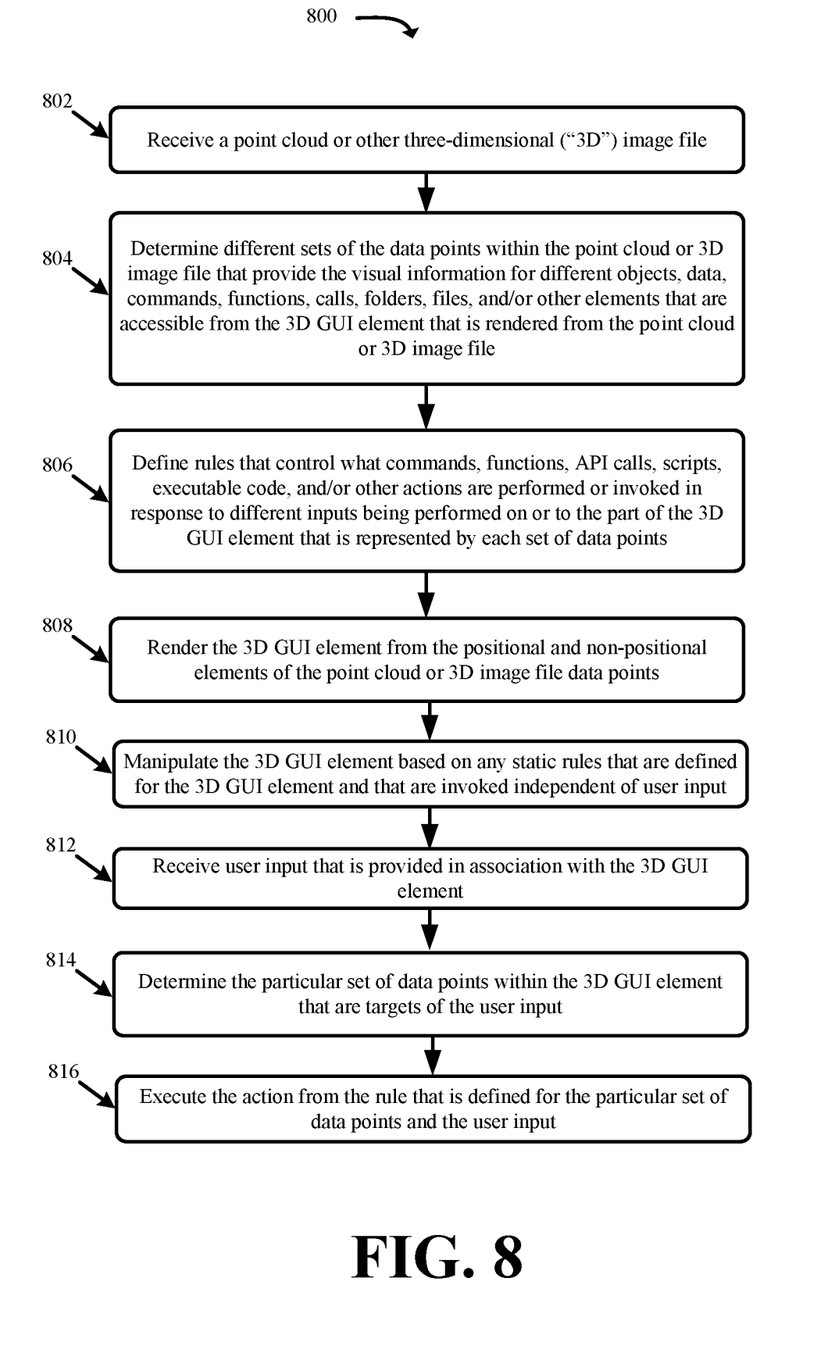
FIG. 8 presents a process for presenting and interacting with a 3D GUI element in accordance with some embodiments presented herein.

FIG. 8 presents a process 800 for presenting and interacting with a 3D GUI element in accordance with some embodiments presented herein. Process 800 may be implemented by the 3D GUI that runs on hardware resources of a user device. The 3D GUI may be implemented within the device operating system ("OS"), within different OS services (e.g., a file system), and/or within different applications running atop the OS.

Process 800 may include receiving (at 802) a point cloud or other 3D image file. The point cloud may include data points that are positioned in 3D space based on positional elements defined for each data point, and that are rendered with different visual characteristics based on different non-positional elements defined for each data point. The collective rendering of the data points from a single point cloud or 3D image file may generate a 3D icon, 3D emoji, 3D wallpaper, and/or other 3D GUI element that includes different visual information at different positions within the 3D space represented by that 3D GUI element. In some embodiments, the 3D GUI may dynamically generate the point cloud based on data associated with applications, functions, folder structures, and/or 2D GUI elements that are to be accessed from the 3D GUI element represented by the point cloud or other 3D image file.

Process 800 may include determining (at 804) different sets of the data points within the point cloud that render and/or provide the visual information for identifying different objects, data, commands, functions, API calls, folders, files, and/or 2D GUI elements that are accessible from the 3D GUI element that is generated based on the point cloud or 3D image file data points. In some embodiments, the different sets of data points may be tagged to identify what they represent. For instance, a first set of data points within a point cloud may include a non-positional element with a "Browser Back" value, a second set of data points within the point cloud may include the value "Browser Forward" for the non-positional element, and a third set of data points within the point cloud may include the value "Browser Halt" for the non-positional element. In some embodiments, the 3D GUI may render the point cloud, and perform image or pattern recognition to tag the different sets of data points with different identifiers for the command, function, API call, folder, file, and/or 2D GUI element represented by that set of data points.

Process 800 may include defining (at 806) rules that control what commands, functions, API calls, scripts, executable code, and/or other actions are performed or invoked in response to different inputs being performed on or to the part of the 3D GUI element that is represented by each set of data points. In some embodiments, the point cloud or 3D image file may be associated with a particular application that runs on the user device, and the particular application may include an input definition that defines the rules for the application commands, functions, API calls, scripts, executable code, and/or other actions that are performed or invoked in response to the different input being applied to the visual information associated with the different sets of data points. For instance, defining (at 806) the rules may include determining a first application function to perform or call with zero or more variables when a particular swipe gesture is performed on or over a first data point set (e.g., a first set of data points) of the point cloud tagged with the "Browser Back" value, and determining a second application function to perform or call with zero or more variables when the particular swipe gesture is performed on or over a second data point set of the point cloud tagged with the "Browser Forward" value. The inputs may include touch inputs that are detected by a touch sensor on a trackpad, touchscreen, or other touch-sensitive input device. The inputs may also include mouse, keyboard, voice, and/or means with which a user may interact with and/or control the device as well as the application features and functionality. The invocable commands, functions, scripts, API calls, executable code, and/or other actions may be specified to the application that is accessed via the 3D GUI element represented by the point cloud, OS functions, system calls, and/or other non-application specific functionality supported by the application or device. The invocable output may also include rotating, manipulating, or otherwise adjusting the rendering of the point cloud to present different visual information therein or to generate various 3D effects by manipulating the positional and/or non-positional elements of the existing data points in response to certain inputs or no inputs.

Process 800 may include rendering (at 808) a 3D GUI element from the positional and non-positional elements of the point cloud or 3D image file data points, and presenting (at 810) the 3D GUI element within a 3D GUI. In some embodiments, the point cloud, 3D image file, and/or 3D GUI may define a default or starting position from which to render the data points. In some embodiments, the 3D GUI may include a GUI that is used to launch or access different functionality of different applications configured on the device. In some embodiments, the 3D GUI may include a specific GUI of an application that becomes accessible when the application is launched, active, open, and/or frontmost.

Process 800 may include manipulating (at 810) the 3D GUI element based on any static rules that are defined for the 3D GUI element and that are invoked independent of user input. For instance, manipulating (at 810) the 3D GUI element may include continuously rendering the point cloud from different render positions to simulate a 3D rotation or movement of the 3D GUI element.

Process 800 may include receiving (at 812) user input that is provided in association with the 3D GUI element. For instance, the user input may be provided when the 3D GUI element is selected, or may be provided over or on a part of the 3D GUI element.

Process 800 may include determining (at 814) the particular set of data points within the 3D GUI element that are targets of the user input. The particular set of data points may include the set of data points that are centered or frontmost on the 3D GUI element when the user input is received (at 812), or may include the set of data points that are at a position where the user input begins and/or ends.

Process 800 may include executing (at 816) the action from the rule that is defined for the particular set of data points and the user input. In some embodiments, executing (at 816) the action may include executing a command, function call, API call, script, and/or executable code of the associated application. The rule may further specify one or more variables for the executed action based on the particular set of data points. For instance, the particular set of data points may correspond to a visualization of a first email, and executing (at 816) the action may include invoking an application call that accesses, opens, and/or otherwise implicates the first email. In some embodiments, executing (at 816) the action may include adjusting the visualization of the 3D GUI element by rendering the point cloud from different render positions that center on and/or bring different sets of data points to focus or the center, and/or by changing the positional and/or non-positional elements of different data points to create various 3D effects within the 3D GUI element. Accordingly, the 3D GUI may modify the data points of the point cloud, and may store the modified point cloud to retain the current state of the 3D GUI element.

Figure 9:
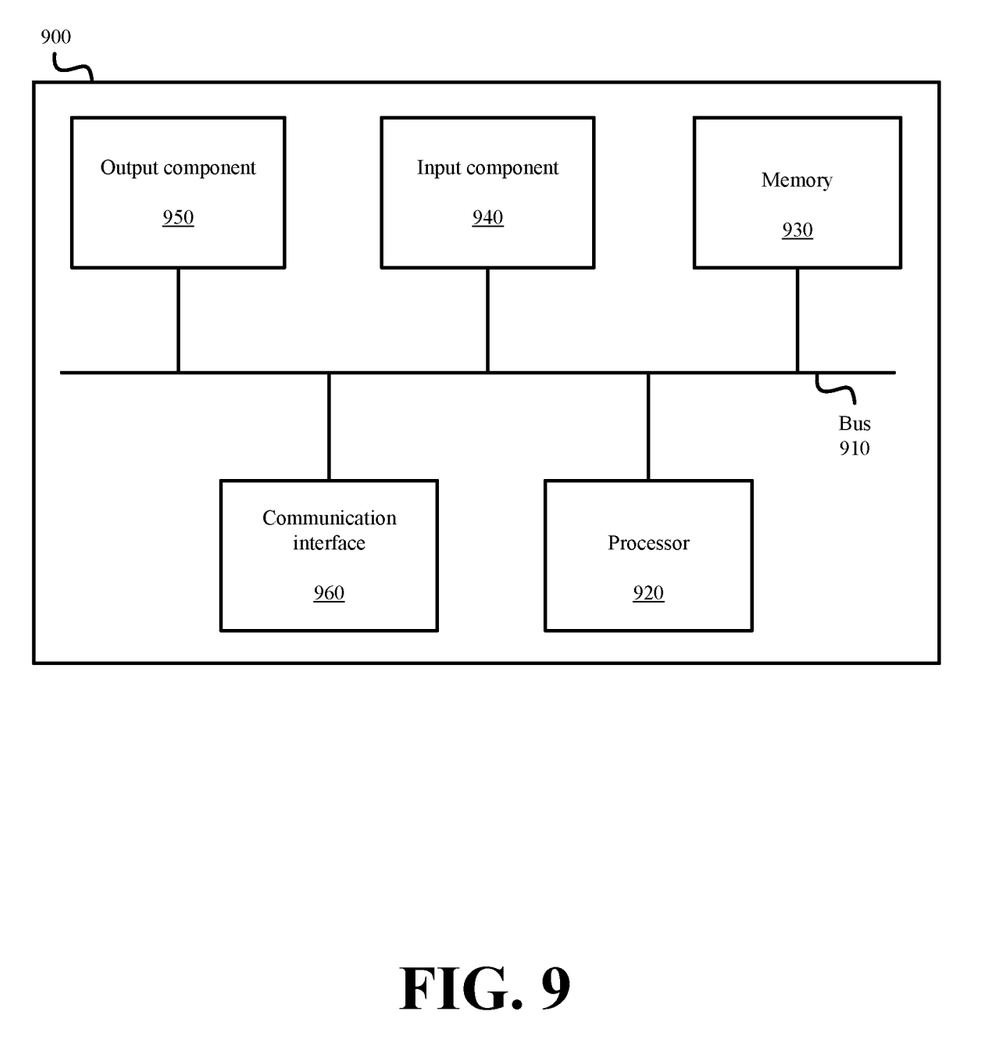
FIG. 9 illustrates example components of one or more devices, according to one or more embodiments described herein.

FIG. 9 is a diagram of example components of device 900. Device 900 may be used to implement one or more of the tools, devices, or systems described above (e.g., the 3D GUI 201, the user device that generates and presents the 3D icons, 3D emojis, 3D wallpapers, and/or 3D GUI elements, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a plurality of three-dimensional ("3D") images, each 3D image of the plurality of 3D images comprising a plurality of image data that is distributed across a 3D space of that 3D image and that visually represents a plurality of application-specific information that is stored or received by a different application in a closed, minimized, unopened, or inactive state;
   defining a first render position in the 3D space of each 3D image of the plurality of 3D images;
   identifying a different first set of the plurality of image data from each 3D image of the plurality of 3D images that corresponds to first application-specific information from the plurality of application-specific information of the different application associated with that 3D image and that becomes visible from the first render position in each 3D image;
   generating a plurality of spherical 3D graphical user interface ("GUI") elements in a GUI from the different first set of image data that becomes visible from the first render position defined in each 3D image, wherein generating a spherical 3D GUI element for a particular application in a closed, minimized, unopened, or inactive state comprises presenting the first application-specific information of the particular application represented by the different first set of image data from a particular 3D image received for the particular application at a center of the spherical 3D GUI element;
   detecting an input that is applied to the spherical 3D GUI element that is associated with the particular application in a closed, minimized, unopened, or inactive state;
   changing from the first render position to a different second render position in the 3D space of the particular 3D image in response to the input that is applied to the spherical 3D GUI element; and
   rotating the spherical 3D GUI element in the GUI in response to changing to the different second render position, wherein rotating the spherical 3D GUI element comprising continuously presenting different image data from plurality of image data of the particular 3D image that comes into view of a changing render frustum as the first render position changes to the second render position, wherein the different image data is image data that is between the different first set of image data and a second set of image data in the 3D space of the particular 3D image, and wherein the second set of image data visually represents second application-specific information of the particular application.

2. The method of claim 1 further comprising:
updating the GUI by presenting the spherical 3D GUI element with the rendering of the different second set of image data from the second render position in the 3D space of the particular 3D image, and by presenting other spherical GUI elements from the plurality of spherical 3D GUI elements with the rendering of the different first set of image data from the first render position in the 3D space of other 3D images of the plurality of 3D images that are not the particular 3D image.

3. The method of claim 1 further comprising:
presenting each spherical 3D GUI element of the plurality of spherical 3D GUI elements as a different volumetric object in the GUI.

4. The method of claim 1, wherein continuously presenting the different image data comprises:
animating the spherical 3D GUI element by moving the different image data that is between the different first set of image data and the different second set of image data of the particular 3D image to different positions about the spherical 3D GUI element.

5. The method of claim 1, wherein the input is a first user input, the method further comprising:
mapping a first executable action to the different first set of image data of the particular 3D image, and a second executable action to the second set of image data of the particular 3D GUI element;
performing the first executable action in response to a second user input being issued on or to a presentation of the first application-specific information in the spherical 3D GUI element; and
performing the second executable action in response to the second user input being issued on or to a presentation of the second application-specific information in the spherical 3D GUI element.

6. The method of claim 1 further comprising:
mapping an executable action of a first application to the different first set of image data of the particular 3D image; and
mapping an executable action of a second application to the different first set of image data of a second 3D image of the plurality of 3D images that is different than the particular 3D image and that is used to generate a second spherical 3D GUI element of the plurality of spherical GUI elements, wherein the spherical 3D GUI element is a 3D icon for accessing functionality of the first application, and the second spherical 3D GUI element is a 3D icon for accessing functionality of the second application.

7. The method of claim 1 further comprising:
detecting a user interaction with a second spherical 3D GUI element of the plurality of spherical 3D GUI elements that is different than the spherical 3D GUI element;
determining an updated render position in the 3D space of a second 3D image of the plurality of 3D images that is associated with the second spherical 3D GUI element based on the user interaction with the second spherical 3D GUI element; and
changing the second spherical 3D GUI element in the GUI by rendering new image data that becomes visible from the updated render position in the 3D space of the second 3D image.

8. The method of claim 1, wherein the input is a user input for rotating the spherical 3D GUI element in a particular direction.

9. The method of claim 1,
wherein detecting the input comprises receiving a notification from the particular application that is accessed using the spherical 3D GUI element; and
wherein rotating the spherical 3D GUI element further comprises presenting the notification from the particular application at the center of the spherical 3D GUI element.

10. The method of claim 1,
wherein detecting the input comprises detecting a new message in an email, messaging, or social media application that is accessed using the spherical 3D GUI element; and
wherein rotating the spherical 3D GUI element further comprises determining that the second set of image data comprises an image of a sender of the new message and presenting the image of the sender at the center of the spherical 3D GUI element.

11. The method of claim 1 further comprising:
determining a rule that is defined for the input and the spherical 3D GUI element, wherein the rule links an executable action to the second set of image data; and
performing the executable action in response to detecting the input being applied to the spherical 3D GUI element and the spherical 3D GUI element presenting a visualization that is generated from rendering the second set of image data.

12. The method of claim 1,
wherein generating the spherical 3D GUI element comprises presenting the different first set of image data from the particular 3D image at the center or a foreground of the spherical 3D GUI element, and presenting the second set of image data from the particular 3D image behind or to a side of the different first set of image data in the spherical 3D GUI element; and
wherein wherein rotating the spherical 3D GUI element further comprises presenting the second set of image data from the particular 3D image at the center or the foreground of the spherical 3D GUI element, and presenting the different first set of image data from the particular 3D image behind or to a side of the second set of image data in the spherical 3D GUI element.

13. The method of claim 1, wherein the particular 3D image is a point cloud comprising a plurality of data points distributed across the 3D space represented by the particular 3D image, the different first set of image data from the particular 3D image comprises a first set of the plurality of data points distributed in a first region of the 3D space, and the second set of image data from the particular 3D image comprises a second set of the plurality of data points distributed in a second region of the 3D space.

14. A device comprising:
one or more processors configured to:
receive a plurality of three-dimensional ("3D") images, each 3D image of the plurality of 3D images comprising a plurality of image data that is distributed across a 3D space of that 3D image and that visually represents a plurality of application-specific information that is stored or received by a different application in a closed, minimized, unopened, or inactive state;
define a first render position in the 3D space of each 3D image of the plurality of 3D images;
identify a different first set of the plurality of image data from each 3D image of the plurality of 3D images that corresponds to first application-specific information from the plurality of application-specific information of the different application associated with that 3D image and that becomes visible from the first render position in each 3D image;

generate a plurality of spherical 3D graphical user interface ("GUI") elements in a GUI from the different first set of image data that becomes visible from the first render position defined in each 3D image, wherein generating a spherical 3D GUI element for a particular application in a closed, minimized, unopened, or inactive state comprises presenting the first application-specific information of the particular application represented by the different first set of image data from a particular 3D image received for the particular application at a center of the spherical 3D GUI element;

detect an input that is applied to the spherical 3D GUI element that is associated with the particular application in a closed, minimized, unopened, or inactive state;

change from the first render position to a different second render position in the 3D space of the particular 3D image of the plurality of 3D images in response to the input that is applied to the spherical 3D GUI element; and rotate the spherical 3D GUI element in the GUI in response to changing to the different second render position, wherein rotating the spherical 3D GUI element comprising continuously presenting different image data from plurality of image data of the particular 3D image that comes into view of a changing render frustum as the first render position changes to the second render position, wherein the different image data is image data that is between the different first set of image data and a second set of image data in the 3D space of the particular 3D image, and wherein the second set of image data visually represents second application-specific information of the particular application.

15. The device of claim 14, wherein the one or more processors are further configured to:

update the GUI by presenting the spherical 3D GUI element with the rendering of the different second set of image data from the second render position in the 3D space of the particular 3D image, and by presenting other spherical GUI elements from the plurality of spherical 3D GUI elements with the rendering of the different first set of image data from the first render position in the 3D space of other 3D images of the plurality of 3D images that are not the particular 3D image.

16. The device of claim 14, wherein the one or more processors are further configured to:3D present each spherical 3D GUI element of the plurality of spherical 3D GUI elements as a different volumetric object in the GUI.

17. The device of claim 14, wherein continuously presenting the different image data comprises:

animating the spherical 3D GUI element by moving the different image data that is between the different first set of image data and the different second set of image data of the particular 3D image to different positions about the spherical 3D GUI element.

18. The device of claim 14, wherein changing the visualization of the particular 3D GUI element comprises:

detect a user interaction with a second spherical 3D GUI element of the plurality of spherical 3D GUI elements that is different than the spherical 3D GUI element;

determine an updated render position in the 3D space of a second 3D image of the plurality of 3D images that is associated with the second spherical 3D GUI element based on the user interaction with the second spherical 3D GUI element; and change the second spherical 3D GUI element in the GUI by rendering new image data that becomes visible from the updated render position in the 3D space of the second 3D image.

19. A non-transitory computer-readable medium storing instructions that, when executed by one or more processors of a three-dimensional ("3D ") interface, cause the 3D interface to perform operations comprising:

receive a plurality of 3D images, each 3D image of the plurality of 3D images comprising a plurality of image data that is distributed across a 3D space of that 3D image and that visually represents a plurality of application-specific information that is stored or received by a different application in a closed, minimized, unopened, or inactive state;

define a first render position in the 3D space of each 3D image of the plurality of 3D images;

generate a plurality of spherical 3D graphical user interface ("GUI") elements in a GUI from the different first set of image data that becomes visible from the first render position defined in each 3D image, wherein generating a spherical 3D GUI element for a particular application in a closed, minimized, unopened, or inactive state comprises presenting the first application-specific information of the particular application represented by the different first set of image data from a particular 3D image received for the particular application at a center of the spherical 3D GUI element;

detect an input that is applied to the spherical 3D GUI element that is associated with the particular application in a closed, minimized, unopened, or inactive state;

change from the first render position to a different second render position in the 3D space of the particular 3D image in response to the input that is applied to the spherical 3D GUI element; and rotate the spherical 3D GUI element in the GUI in response to changing to the different second render position, wherein rotating the spherical 3D GUI element comprising continuously presenting different image data from plurality of image data of the particular 3D image that comes into view of a changing render frustum as the first render position changes to the second render position, wherein the different image data is image data that is between the different first set of image data and a second set of image data in the 3D space of the particular 3D image, and wherein the second set of image data visually represents second application-specific information of the particular application.

* * * * *